United States Patent
Nagasawa et al.

(10) Patent No.: US 11,146,773 B2
(45) Date of Patent: Oct. 12, 2021

(54) POINT CLOUD DATA COMMUNICATION SYSTEM, POINT CLOUD DATA TRANSMITTING APPARATUS, AND POINT CLOUD DATA TRANSMISSION METHOD

(71) Applicant: Media Kobo, Inc., Tokyo (JP)

(72) Inventors: Kazuo Nagasawa, Tokyo (JP); Kazuma Ohashi, Tokyo (JP)

(73) Assignee: Media Kobo, Inc., Tokyo (JP)

( * ) Notice: Subject to any disclaimer, the term of this patent is extended or adjusted under 35 U.S.C. 154(b) by 258 days.

(21) Appl. No.: 16/417,693

(22) Filed: May 21, 2019

(65) Prior Publication Data
US 2020/0267369 A1    Aug. 20, 2020

(30) Foreign Application Priority Data
Feb. 19, 2019  (JP) ................................ 2019-027142

(51) Int. Cl.
*H04N 13/194* (2018.01)
*H04N 13/167* (2018.01)
(Continued)

(52) U.S. Cl.
CPC ......... *H04N 13/194* (2018.05); *H04N 13/117* (2018.05); *H04N 13/167* (2018.05); *H04N 19/197* (2014.11); *H04N 19/597* (2014.11)

(58) Field of Classification Search
CPC .. H04N 13/194; H04N 13/167; H04N 13/117; H04N 13/275; H04N 13/282;
(Continued)

(56) References Cited

U.S. PATENT DOCUMENTS 7,102,639 B2    9/2006  Oka
9,832,447 B2    11/2017 Konno
(Continued)

FOREIGN PATENT DOCUMENTS

JP    2003-153263 A    5/2003
JP    2004-213641 A    7/2004
(Continued)

OTHER PUBLICATIONS

JP Office Action dated Jul. 30, 2019 to corresponding JP patent application No. 2019-027142.
(Continued)

*Primary Examiner* — Tung T Vo
(74) *Attorney, Agent, or Firm* — Polsinelli PC

(57) ABSTRACT

A display request including designation related to a display state of a stereoscopic shape in a three-dimensional space is transmitted from a receiving apparatus 200 to a transmitting apparatus 100, and the transmitting apparatus 100 extracts point cloud data of a part corresponding to the display request from among the point cloud data stored in a point cloud data storage unit 10 in response to the display request and transmits the extracted point cloud data to the receiving apparatus 200. Accordingly, only the point cloud data of the part which is necessary for the display state of the stereoscopic shape which is actually displayed in the three-dimensional space by the receiving apparatus 200 is transmitted, and thus it is possible to transmit only the point cloud data necessary for display within a practically acceptable short time on a communication network 300 even though the entire data amount of the point cloud data stored in the point cloud data storage unit 10 is huge.

8 Claims, 4 Drawing Sheets

(51) Int. Cl.
*H04N 13/117* (2018.01)
*H04N 19/196* (2014.01)
*H04N 19/597* (2014.01)

(58) Field of Classification Search
CPC .. H04N 13/271; H04N 13/243; H04N 19/197; H04N 19/597
USPC .......................................................... 348/43
See application file for complete search history.

(56) References Cited

U.S. PATENT DOCUMENTS

| | | | |
|---|---|---|---|
| 10,650,590 B1* | 5/2020 | Topiwala | G06F 3/011 |
| 2002/0076085 A1* | 6/2002 | Shimazu | H04N 13/194 |
| | | | 382/100 |
| 2004/0150646 A1 | 8/2004 | Oka | |
| 2013/0321593 A1* | 12/2013 | Kirk | H04N 13/243 |
| | | | 348/51 |
| 2016/0119607 A1 | 4/2016 | Konno | |
| 2017/0075330 A1 | 3/2017 | Matsunami et al. | |
| 2018/0343442 A1* | 11/2018 | Yoshikawa | G08B 13/19641 |
| 2019/0089942 A1* | 3/2019 | Hanamoto | G06T 17/00 |
| 2019/0114485 A1* | 4/2019 | Chan | H04N 21/4223 |
| 2019/0253667 A1* | 8/2019 | Valli | G02B 27/017 |
| 2020/0014953 A1* | 1/2020 | Mammou | H04N 19/597 |
| 2020/0267369 A1* | 8/2020 | Nagasawa | H04N 13/275 |
| 2021/0006614 A1* | 1/2021 | Oyman | H04L 65/608 |
| 2021/0019936 A1* | 1/2021 | Oyman | G06T 17/00 |
| 2021/0035352 A1* | 2/2021 | Harviainen | G02B 27/0172 |
| 2021/0049779 A1* | 2/2021 | Harviainen | G06T 7/38 |

FOREIGN PATENT DOCUMENTS

| | | |
|---|---|---|
| JP | 2015-210670 A | 11/2015 |
| JP | 6062039 B2 | 1/2017 |
| WO | WO 2014/162554 A1 | 10/2014 |
| WO | WO 2015/151685 A1 | 10/2015 |
| WO | WO 2019/003953 A1 | 6/2018 |

OTHER PUBLICATIONS

JP Office Action dated Oct. 23, 2019 to corresponding JP patent application No. 2019-027142.

* cited by examiner

POINT CLOUD DATA COMMUNICATION SYSTEM, POINT CLOUD DATA TRANSMITTING APPARATUS, AND POINT CLOUD DATA TRANSMISSION METHOD

CROSS REFERENCE TO RELATED APPLICATIONS

This application claims priority to Application No. 2019-027142 filed in Japan on Feb. 19, 2019. The entire contents of each application are hereby incorporated by reference.

TECHNICAL FIELD

The present invention relates to a point cloud data communication system, a point cloud data transmitting apparatus and a point cloud data transmission method, and more particularly, to a technique for transmitting point cloud data via a communication network.

BACKGROUND ART

In the past, point cloud data has been used as one of data indicating a three-dimensional shape of an object on a computer. The point cloud data is data including a set of a plurality of points as in the meaning thereof. In many cases, each point has position information, color information, or the like indicated by orthogonal coordinates (x, y, z) of a three-dimensional space. The point cloud data can be acquired by several methods. For example, a method of using a three-dimensional laser scanner and a method of restoring a three-dimensional shape using images taken by a plurality of cameras (see, for example, Patent Document 1) are known.

In a system disclosed in Patent Document 1, images captured by a plurality of cameras installed to photograph a photographing target area from a plurality of angles are input, and depth information indicating distances of objects from the cameras included in a plurality of captured images is calculated for each pixel. Then, a plurality of projection planes are set in accordance with a relative angular relation of a plurality of cameras, and values of pixels of the objects included in a plurality of captured images are projected in accordance with the depth information in directions of the projection planes corresponding to the respective captured images, so that point cloud data indicating a stereographic image in which the objects included in a plurality of captured images are synthesized into one is generated.

The point cloud is generally large in an amount of data since a huge amount of points are included. The amount of data is enormously increased as the resolution of a display target object increases or as a size and a range of the display target object increase. Therefore, how to handle and control a huge amount of data is an important issue. In particular, it is difficult to transmit and receive a huge amount of point cloud data on a communication network within a practically acceptable short time. Therefore, in order to cope with such problems, in a current situation, the point cloud data is often converted to surface format data and treated as polygon mesh or triangle mesh.

CITATION LIST

Patent Document

Patent Document 1: Japanese Patent No. 6062039

SUMMARY OF THE INVENTION

Technical Problem

The invention is made to solve such problems, and it is an object of the invention to enable transmission of a large amount of data of point cloud data within a practically acceptable short time on a communication network.

Solution to Problem

In order to solve the above-mentioned problems, in a point cloud data communication system of the invention, a display request including designation related to a display state of a stereoscopic shape in a three-dimensional space is transmitted from a receiving apparatus to a transmitting apparatus, and the transmitting apparatus extracts point cloud data of a part corresponding to the display request from among the point cloud data stored in a point cloud data storage unit in response to the display request and transmits the extracted partial point cloud data to the receiving apparatus.

Advantageous Effects of the Invention

According to the invention configured as described above, only the point cloud data of the part which is necessary for the display state of the stereoscopic shape which is actually displayed in the three-dimensional space by the receiving apparatus is transmitted from the transmitting apparatus to the receiving apparatus, and thus it is possible to transmit the point cloud data necessary for display within a practically acceptable short time on a communication network even though the entire data amount of the point cloud data stored in the point cloud data storage unit of the transmitting apparatus is huge.

MODE FOR CARRYING OUT THE INVENTION

Figure 1:
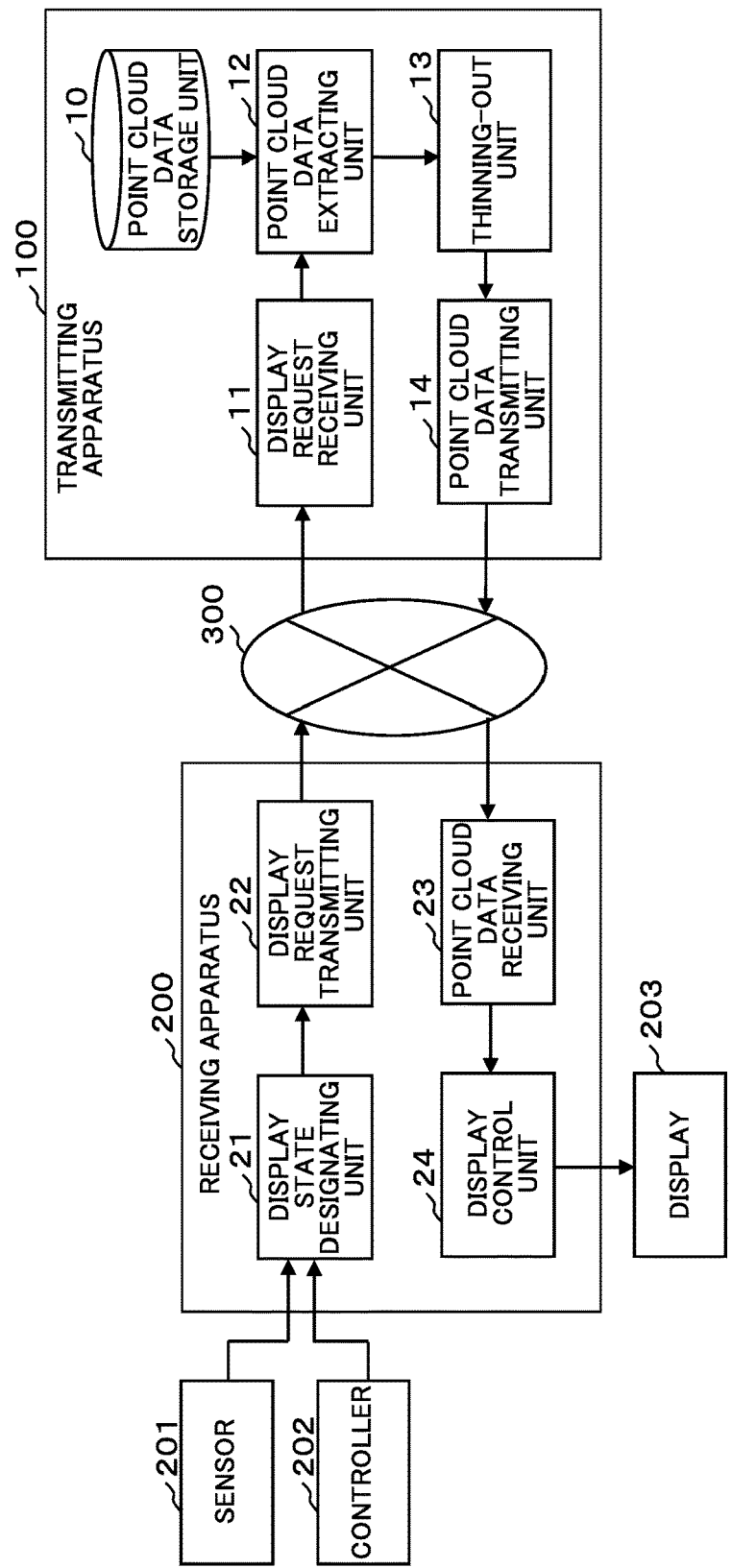
FIG. 1 is a block diagram illustrating an example of a functional configuration of a point cloud data communication system according to the present embodiment.

Hereinafter, one embodiment of the invention will be described with reference to the appended drawings. FIG. 1 is a block diagram illustrating an example of a functional configuration of a point cloud data communication system according to the present embodiment. The point cloud data communication system according to the present embodiment includes a transmitting apparatus (point cloud data transmitting apparatus) 100 and a receiving apparatus 200, and the point cloud data is transmitted from the transmitting apparatus 100 to the receiving apparatus 200 via a communication network 300.

As illustrated in FIG. 1, the transmitting apparatus 100 includes a display request receiving unit 11, a point cloud data extracting unit 12, a thinning-out unit 13, and a point cloud data transmitting unit 14 as functional components thereof. The transmitting apparatus 100 further includes a point cloud data storage unit 10 as a storage medium. Each of the functional blocks 11 to 14 can be constituted by any of hardware, a digital signal processor (DSP), and software. For example, when constituted by software, each of the functional blocks 11 to 14 is actually configured to include a CPU, a RAM, a ROM, and the like of a computer and is realized as a program stored in a storage medium such as a RAM, a ROM, a hard disk, or a semiconductor memory operates.

Also, the receiving apparatus 200 includes a display state designating unit 21, a display request transmitting unit 22, a point cloud data receiving unit 23 and a display control unit 24 as functional components thereof. A sensor 201, an operating unit 202, and a display 203 are connected to the receiving apparatus 200. Each of the functional blocks 21 to 24 can be constituted by any of hardware, a DSP, and software. For example, when constituted by software, each of the functional blocks 21 to 24 is actually configured to include a CPU, a RAM, a ROM, and the like of a computer and is realized as a program stored in a storage medium such as a RAM, a ROM, a hard disk, or a semiconductor memory operates.

The point cloud data storage unit 10 stores point cloud data indicating a stereoscopic shape in a three-dimensional space. The point cloud data stored in the point cloud data storage unit 10 is generated, for example, by the method disclosed in Patent Document 1. In other words, the point cloud data is point cloud data indicating a stereoscopic image in which stereoscopic shapes included in a plurality of captured images by a plurality of cameras installed to photograph an arbitrary photographing target area from a plurality of angles are synthesized into one as values of pixels of the stereoscopic shapes are projected onto positions based on depth information.

The photographing target area is an area set in an arbitrary indoor or outdoor place, and, for example, an inside of a chamber, a corridor, stairs or the like in a building, or an arbitrary outdoor place with an arbitrary landscape background. The term "stereoscopic shape" refers to a shape related to all stereoscopic objects included in a captured image obtained by photographing the photographing target area. For example, when the inside of the chamber is photographed, all of various types of structures such as a wall, a column, a ceiling, and a floor of the chamber, furniture and accessories installed in the chamber, various types of installed objects such as home appliances, various types of mobile objects such as people or pets, and the like correspond to the stereoscopic shape. All of a plurality of cameras installed at a plurality of locations to photograph the photographing target area from a plurality of angles are installed so that their optical axes face a predetermined position within the photographing target area (for example, at central position of the chamber when the photographing target area is the inside of the chamber).

Figure 2:
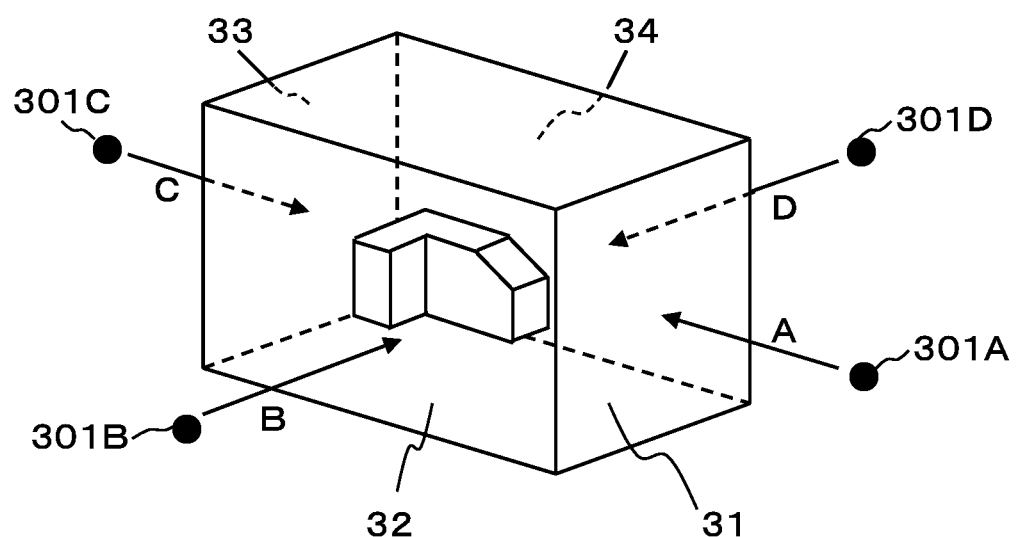
FIG. 2 is a diagram for describing a process of generating point cloud data of a stereoscopic shape from a plurality of captured images.

FIG. 2 is a diagram for describing a process of generating point cloud data of a stereoscopic shape from a plurality of captured images through a point cloud data generating apparatus which is not illustrated. As illustrated in FIG. 2, the point cloud data generating apparatus sets a plurality of projection planes 31 to 34 in accordance with a relative angular relation of a plurality of cameras 301A to 301D installed to photograph the photographing target area from a plurality of angles. In the example of FIG. 2, in order to simplify the description, the projection planes 31 to 34 are set in four directions with an angle of 90° therebetween.

In other words, the four cameras 301A to 301D are installed at positions indicated by the mark • (for example, wall surfaces in the four directions in the chamber), and postures of the cameras 301A to 301D are set to perform photography in directions indicated by arrows A to D (in directions toward the center of the chamber) from the positions. The point cloud data generating apparatus sets the projection planes 31 to 34 in the photographing direction corresponding to the installation positions and the installation postures of the cameras 301A to 301D. Note that, information related to the installation positions and the installation postures of the cameras 301A to 301D is registered in the point cloud data generating apparatus by prior calibration.

Each of the cameras 301A to 301D is a stereo camera, and a parallax image is obtained by simultaneously photographing the stereoscopic shape in the photographing target area in two different directions. The point cloud data generating apparatus analyzes the parallax image using a known technique, and calculates depth information indicating distances of the stereoscopic shapes included in a plurality of captured images captured respectively by a plurality of cameras 301A to 301D from the cameras 301A to 301D for each pixel.

Then, the point cloud data generating apparatus generates a stereoscopic image in which the stereoscopic shapes included in a plurality of captured images are synthesized into one by projecting values of the pixels of the stereographic shapes included in a plurality of captured images in the directions of projection planes 31 to 34 corresponding to the respective captured images in accordance with the depth information. In other words, the point cloud data generating apparatus causes the values of the pixels of the stereoscopic shapes included in the captured images input from the first camera 301A to be projected onto a position apart from the position of the first camera 101A in the direction of the arrow A in which the projection plane 31 is present by the distance indicated by the depth information. Here, the values of the pixels to be projected may be RGB values originally possessed by the captured image or may be binarized or gray-scaled values. The point cloud data generating apparatus performs the same process on the captured images input from the second to fourth cameras 301B to 301D.

As described above, the same photographing target area is photographed by a plurality of cameras 301A to 301D, and the values of the pixels of the stereoscopic shapes included in the respective captured images are synthesized into one image, and thus a plurality of pixel values are projected onto the same position from a plurality of directions in a superimposed manner. The point cloud data storage unit 10 stores the point cloud data generated as described above. The individual point data constituting the point cloud data includes position information indicating a position of a point in a virtual three-dimensional space, color information including RGB values (which may be binarized values or grayscaled values) originally possessed by the captured image, identification information (a camera ID or the like) indicating a camera from which the captured image is projected, and the like.

The point cloud data stored in the point cloud data storage unit 10 may be point cloud data for displaying a stereoscopic image which is a still image in which each stereoscopic shape in the photographing target area is stationary or may be point cloud data for displaying a stereoscopic image which is a moving image in which all or a part of the stereoscopic shape in the photographing target area is movable. In the case of the point cloud data for displaying the stereoscopic image which is the moving image, the point cloud data storage unit 10 stores point cloud data for displaying a stereoscopic image at predetermined time intervals (for each frame).

As will be described later, in the present embodiment, when the receiving apparatus 200 arbitrarily designates the viewpoint of the user and the direction of the line of sight in the virtual three-dimensional space constructed on the computer, it is possible to cause the display 203 to display the stereographic image including the point cloud data synthesized as described above (the image for rendering the stereographic shape included in the photographing target area to be rendered in the virtual three-dimensional space and displayed on the display 203) in a state in which the user views a desired direction from a desired viewpoint.

In this case, an image position in a front of a stereoscopic body when the stereographic image synthesized by the point cloud data is viewed from a viewpoint designated by the user is rendered with a priority. In the example of FIG. 2, when the viewpoint designated by the user is in front of a page plane, and the line of sight faces in the direction of the paper plane from the viewpoint, the values of the pixels included in the captured image by the first camera 301A and the second camera 301B are rendered with a priority over the values of the pixels included in the captured image by the third camera 301C and the fourth camera 401D. It is possible to arbitrarily decide to which of a part of the point cloud data generated from the captured image by the first camera 301A and a part of the point cloud data generated from the captured image by the second camera 301B a priority is given. For example, it is possible to perform a process of giving a priority to a part which is shorter in the distance from the viewpoint to the stereoscopic shape.

In the point cloud data communication system of the present embodiment, a notification indicating the viewpoint and the direction of the line of sight designated by the user of the receiving apparatus 200 is given from the receiving apparatus 200 to the transmitting apparatus 100. The transmitting apparatus 100 extracts the point cloud data to be rendered with a priority in accordance with the viewpoint and the direction of the line of sight notified from the receiving apparatus 200 from the point cloud data storage unit 10 and transmits the extracted point cloud data to the receiving apparatus 200. The receiving apparatus 200 renders the synthetic image of the stereoscopic shape in the three-dimensional space using the point cloud data transmitted from the transmitting apparatus 100 and causes the display 203 to display the synthetic image of the stereoscopic shape. Configurations of the functional blocks 11 to 14 and 21 to 24 related to this operation will be described below.

The display state designating unit 21 of the receiving apparatus 200 designates the display state of the stereoscopic shape to be displayed on the display 203. The display state of the stereoscopic shape is the viewpoint and the direction of the line of sight from the viewpoint that are variable in the three-dimensional space and refers to the viewpoint designated by the user and the direction of the line of sight. Various methods can be used as a method of designating the viewpoint and the direction of the line of sight direction by the user.

For example, the user can arbitrarily designate a desired viewpoint and a direction of the line of sight by operating the operating unit 202 in a state in which the stereoscopic image based on the point cloud data is displayed on the display 203. In this case, the user can perform designation of causing the viewpoint to be moved to a desired position or causing the line of sight to a desired direction with reference to the display state of the stereoscopic image being currently displayed by operating the operating unit 202. The operating unit 202 is, for example, a mouse, a keyboard, a touch panel, a controller, a changeover switch, or the like. The display state designating unit 21 specifies the viewpoint and the direction of the line of sight as the designation related to the display state of the stereoscopic shape on the basis of operation information input from the operating unit 202.

As another example, the display state designating unit 21 can also designate the display state of the stereoscopic shape related to the viewpoint and the direction of the line of sight on the basis of at least one of acceleration information and angular velocity information input from the sensor 201. For example, the receiving apparatus 200, the sensor 201 and the display 203 are constituted by a mobile terminal in which these are installed in a single housing. An example of the mobile terminal is a smartphone or a tablet terminal. Also, the sensor 201 is constituted by at least one of an acceleration sensor and an angular velocity sensor.

Then, when the user holds the mobile terminal in his or her hand and arbitrarily moves the mobile terminal in a real space, the sensor 201 detects content of a motion at that time as the acceleration information or the angular velocity information. In this case, the user can arbitrarily move the mobile terminal in a vertical direction, a left and right direction, and a back and forth direction or rotate the mobile terminal arbitrarily. The display state designating unit 21 detects a relative change from current designated content of the viewpoint and the direction of the line of sight on the basis of the acceleration information and the angular velocity information detected by the sensor 201 in accordance with the motion of the mobile terminal and specifies the changed viewpoint and the changed direction of the line of sight as the designation related to the display state of the stereographic shape.

As still another example, the sensor 201 and the display 203 may be constituted by a head mounted display (HMD) in which these are installed in a single housing. Then, when the user wearing the HMD on the head moves arbitrarily in the real space, the sensor 201 detects content of a motion of the HMD at that time as acceleration information or angular velocity information. The display state designating unit 21 detects a relative change from current designated content of the viewpoint and the direction of the line of sight on the basis of the acceleration information and the angular velocity information detected by the sensor 201 in accordance with the motion of the HMD and specifies the changed viewpoint and the changed direction of the line of sight as the designation related to the display state of the stereographic shape.

Note that, FIG. 1 illustrates a configuration including both of the sensor 201 and the operating unit 202, but only one of them may be included.

The display request transmitting unit 22 of the receiving apparatus 200 transmits a display request including the designation related to the display state of the stereoscopic shape in the three-dimensional space to the transmitting apparatus 100. In other words, the display request transmitting unit 22 transmits the display request including the viewpoint and the direction of the line of sight designated by the display state designating unit 21 to the transmitting apparatus 100 as the designation related to the display state of the stereographic shape. The viewpoint and the direction of the line of sight in the three-dimensional space may be designated as an absolute value in the three-dimensional space or may be designated as a value indicating a relative amount of change from when the previous display request is transmitted.

The display request transmitting unit 22 repeatedly transmits the display request at predetermined time intervals. The time interval for transmitting the display request may be appropriately determined depending on the purpose for displaying the stereoscopic image on the display 203. Note that, the display request may be repeatedly transmitted at predetermined time intervals only when the point cloud data stored in the point cloud data storage unit 10 is for moving images, and when the point cloud data stored in the point cloud data storage unit 10 is for still images, the display request may be transmitted only when there is a change at least one of the designated viewpoint and the direction of the line of sight.

The display request receiving unit 11 of the transmitting apparatus 100 receives the display request transmitted from the receiving apparatus 200. The point cloud data extracting unit 12 extracts point cloud data of a part corresponding to the display request received by the display request receiving unit 11 from among the point cloud data stored in the point cloud data storage unit 10. In other words, among the point cloud data stored in the point cloud data storage unit 10, the point cloud data extracting unit 12 extracts point cloud data of a part to which a priority is given when the stereoscopic shape is displayed in the three-dimensional space in accordance with the viewpoint and the direction of the line of sight included in the display request.

When the point cloud data stored in the point cloud data storage unit 10 is for moving images, the point cloud data extracting unit 12 extracts the point cloud data for displaying the stereoscopic image at predetermined time intervals from the point cloud data storage unit 10, and extracts only the point cloud data of the part to which a priority is given when the stereoscopic shape is displayed in the three-dimensional space in accordance with the viewpoint and the direction of the line of sight included in the display request at the time of extraction at each timing.

The point cloud data of the part to which a priority is given when the stereographic shape is displayed refers to point cloud data corresponding to a side positioned in the front other than the point cloud data corresponding to a side hidden by the back side of the stereoscopic shape when viewed from the designated viewpoint as described with reference to FIG. 2. Also, it is point cloud data corresponding to the stereoscopic shape which is not far but shorter in the distance from the designated viewpoint to the stereoscopic shape when a plurality of stereographic shapes positioned in the front of the stereographic shape when viewed from the designated viewpoint overlap in the designated direction of the line of sight.

Specifically, the point cloud data extracting unit 12 decides a camera in a direction to which a priority is given in accordance with the viewpoint on the basis of a relation between the viewpoint included in the display request and positions of a plurality of cameras (positions of each camera on the virtual three-dimensional space corresponding to the installation positions in the real space). Then, the point cloud data generated from the values of the pixels included in the captured image by the decided camera is extracted from among the point cloud data stored in the point cloud data storage unit 10 as the point cloud data of the part to which a priority is given when the stereoscopic shape is displayed in the three-dimensional space. Note that, the position information of the camera in the three-dimensional space is registered in the transmitting apparatus 100 by prior calibration.

Further, the point cloud data extracting unit 12 extracts the point cloud data corresponding to the stereoscopic shape to which a priority is given in accordance with the distance from the viewpoint among the point cloud data generated from the values of the pixels included in the captured image by the camera decided as described above. The distance from the viewpoint to the stereoscopic shape can be calculated from the position information of the point cloud data constituting the stereoscopic shape and the position information of the viewpoint.

In other words, the point cloud data extracting unit 12 further extracts the point cloud data corresponding to the stereoscopic shape which is shorter in the distance from the viewpoint among a plurality of stereoscopic shapes overlapping in the direction of the line of sight from among the point cloud data generated from the values of the pixels included in the captured image by the decided camera as the point cloud data of the part to which a priority is given when the stereoscopic shape is displayed in the three-dimensional space on the basis of a relation between the viewpoint included in the display request, the direction of the line of sight, and the position of the stereographic shape.

Note that, the process of extracting the point cloud data corresponding to the stereographic shape to which a priority is given in accordance with the distance from the viewpoint may be omitted, and it may be coped with by a thinning-out processing performed by the thinning-out unit 13 to be described later.

The point cloud data extracting unit 12 may extract the point cloud data of the part to which a priority is given when the stereoscopic shape is displayed in the three-dimensional space in the entire range in the front when viewed in the direction of the line of sight from the viewpoint included in the display request among the point cloud data stored in the point cloud data storage unit 10 or may extract the point cloud data of the part to which a priority is given when the stereoscopic shape is displayed in the three-dimensional space in a predetermined field of view specified on the basis of the viewpoint and the direction of the line of sights included in the display request. In the former case, the point cloud data is extracted in a range in which an angle of field is 180° when viewed in the direction of the line of sight from the designated viewpoint. In the latter case, the point cloud data is extracted in a predetermined range in which an angle of field is smaller than 180° when viewed in the direction of the line of sight from the designated viewpoint.

As a method of clipping the point cloud data in a predetermined range as in the latter case, two methods can be considered broadly, and any of them can be applied. A first method is a method in which the point cloud data is divided into a plurality of areas in advance in the three-dimensional space, and the point cloud data of the divisional area included in a field of view of a predetermined range when viewed in the direction of the line of sight from the designated viewpoint is extracted. The area division can be performed using various division methods such as a method of dividing in units of grids, a method of dividing in units of structures, a method of dividing in units of shapes corresponding to the edge of the stereoscopic shape, and a method of dividing in units of meta balls.

A second method is a method of dynamically clipping the point cloud data included in a field of view of a predetermined range in accordance with the designated display state without dividing the point cloud data into a plurality of areas in advance in the three-dimensional space. In the point cloud data stored in the point cloud data storage unit 10, each point has position information indicating positions of points (points onto which the values of the pixels of the stereoscopic shape included in the captured image by the camera are projected in accordance with the depth information) in the three-dimensional space. On the other hand, if the position of the viewpoint and the direction of the line of sight are designated, it is possible to calculate a range in the three-dimensional space corresponding to a field of view of a predetermined range when viewed in the direction of the line of sight from that viewpoint. The point cloud data extracting unit 12 extracts the point cloud data in which the position information is included in the range of the field of view calculated accordingly.

The thinning-out unit 13 decides a part with a low priority in accordance with the display state of the stereoscopic shape specified on the basis of the designation included in the display request received by the display request receiving unit 11, and executes a process of thinning out the point cloud data of the part with the low priority from among the point cloud data extracted by the point cloud data extracting unit 12. When a part is thinned out from among the point cloud data extracted by the point cloud data extracting unit 12, the thinning-out unit 13 decreases a priority of a part related to a stereoscopic shape having a long distance from the viewpoint in accordance with the display state related to the perspective of the stereoscopic shape decided on the basis of the distance from the viewpoint, and increases the thinning-out amount of the point cloud data.

In other words, the point cloud data stored in the point cloud data storage unit 10 has position information indicating the position in the three-dimensional space for each point. Therefore, it is possible to calculate the distance from the position of the viewpoint to the stereoscopic shape. The thinning-out unit 13 calculates the distance from the viewpoint to the stereoscopic shape on the basis of the position information of the viewpoint and the position information of each point, and increases the thinning-out amount of the point cloud data of the part related to the stereoscopic shape having a long distance from the viewpoint.

The stereoscopic shape which is long in the distance from the viewpoint is a stereoscopic shape at a position far from the viewpoint and is displayed with a small size when displayed on the display 203. Since it is not necessary to use a lot of point cloud data for the stereoscopic shape which is displayed with a small size, the point cloud data is thinned out. On the other hand, the stereoscopic shape which is short in the distance from the viewpoint is a stereoscopic shape close to the viewpoint, and is displayed with a large size when displayed on the display 203. It is desirable to use a relatively large number of point cloud data for the stereoscopic shape displayed with a large size in order to display at a relatively high resolution. Therefore, the point cloud data of the part related to the stereoscopic shape located near the viewpoint is not thinned out or reduced in the thinning-out amount.

It is possible to arbitrarily set rules in advance for how much the point cloud data is thinned out at what distance from the viewpoint. Further, an arbitrary method may be used as a method of thinning out when thinning-out is performed. For example, a predetermined unit area to be thinned out may be decided, and point data to be thinned out may be randomly selected from the unit area. Alternatively, point data having the same or similar color information may be selected and thinned out from the unit area. Alternatively, the color information possessed by each piece of point data included in the unit area may be averaged, and averaged information may be included in representative point data, and then the other point data may be thinned out.

The point cloud data transmitting unit 14 transmits the point cloud data remaining after thinning-out the thinning-out unit 13 among the point cloud data extracted by the point cloud data extracting unit 12 to the receiving apparatus 200. The point cloud data stored in the point cloud data storage unit 10 is generated from the values of the pixels of a plurality of captured images obtained by photographing a certain photographing target area by a plurality of cameras and has a large amount of data. On the other hand, the point cloud data extracted by the point cloud data extracting unit 12 is obtained by extracting a part to which a priority is given for rendering in accordance with the designated viewpoint and the direction of the line of sight from among the point cloud data stored in the point cloud data storage unit 10 and thus has a reduced mount of data. Therefore, the point cloud data transmitting unit 14 may transmit the point cloud data extracted by the point cloud data extracting unit 12 to the receiving apparatus 200. However, when it is thinned out by the thinning-out unit 13, it is possible to further reduce the amount of data without substantially degrading the display accuracy of the stereoscopic image displayed on the display 203. Therefore, it is more desirable for the point cloud data transmitting unit 14 to transmit the point cloud data remaining after thinning-out by thinning-out unit 13 to the receiving apparatus 200.

The point cloud data receiving unit 23 receives the point cloud data transmitted from the transmitting apparatus 100 in response to the display request transmitted by the display request transmitting unit 22. The display control unit 24 renders the stereoscopic image in the three-dimensional space on the basis of the point cloud data received by the point cloud data receiving unit 23 and causes the display 203 to display the stereoscopic image. The stereoscopic image displayed on the display 203 is generated in accordance with the viewpoint and the direction of the line of sight designated by the user, and it is possible to cause the stereoscopic image to be displayed in a state in which the stereoscopic shape is viewed in various directions from various viewpoints. Further, it is possible to display the stereoscopic image in a state in which a wide range of three-dimensional space is overlooked, a stereoscopic image in a state in which a specific stereoscopic shape is closed up and enlarged, or the like.

Figure 3:
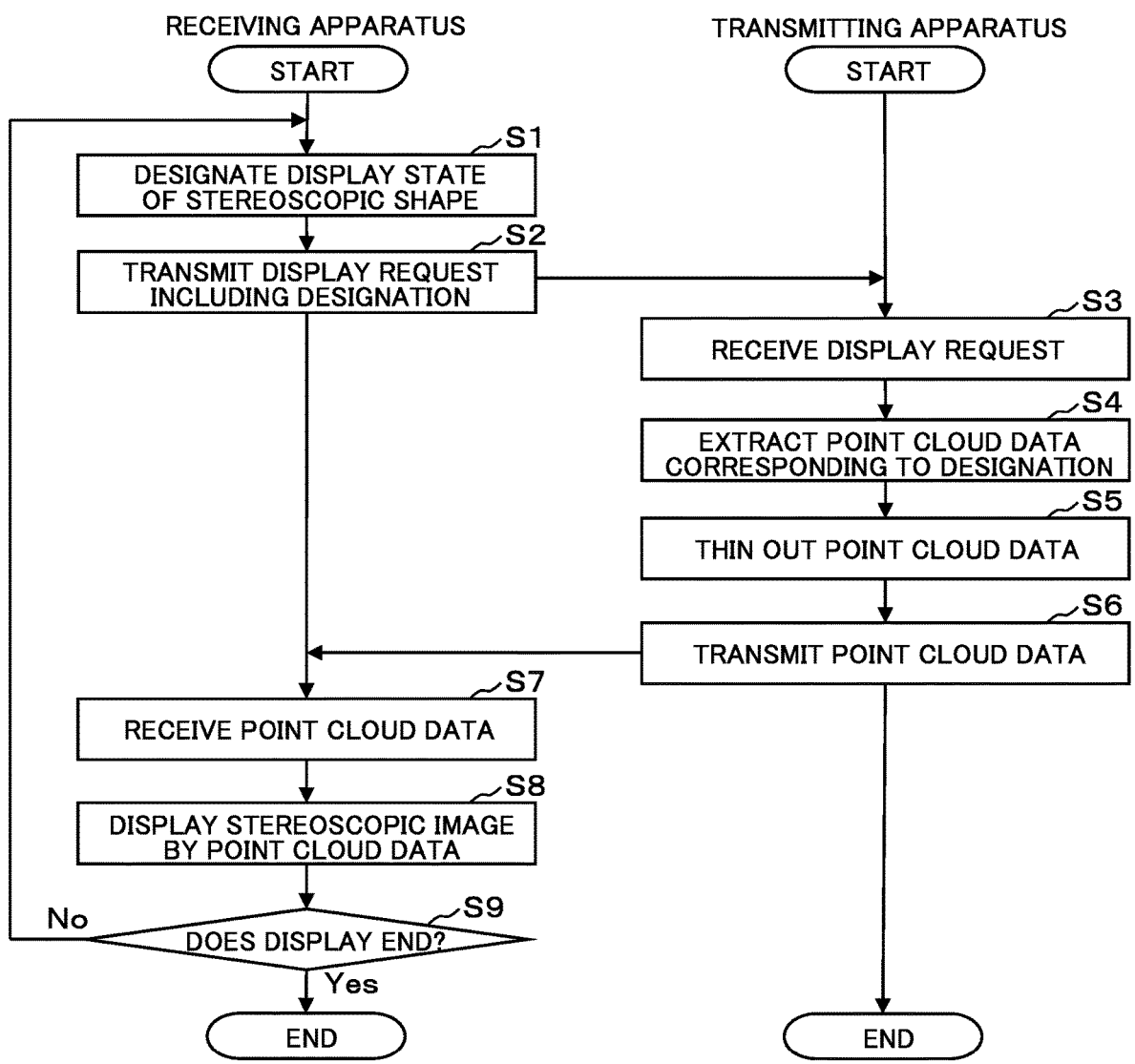
FIG. 3 is a flowchart illustrating an operation example of a point cloud data communication system according to the present embodiment.

FIG. 3 is a flow chart illustrating an operation example of the point cloud data communication system having the above configuration according to the present embodiment. The operation of the flowchart illustrated in FIG. 3 starts when the user of the receiving apparatus 200 gives an instruction to display the stereoscopic shape.

First, on the basis of the output information from sensor 201 or the output information from the operating unit 202, the display state designating unit 21 of the receiving apparatus 200 specifies the viewpoint that is variable in the three-dimensional space and the direction of the line of sight from the viewpoint as the designation related to the display state of the stereoscopic shape to be displayed on the display 203 (step S1). Then, the display request transmitting unit 22 transmits the display request including the viewpoint and the direction of the line of sight designated by the display state designating unit 21 as the designation related to the display state of the stereographic shape to the transmitting apparatus 100 (step S2).

If the display request receiving unit 11 of the transmitting apparatus 100 receives the display request transmitted from the receiving apparatus 200 (step S3), the point cloud data extracting unit 12 extracts the point cloud data of the part to which a priority is given when the stereoscopic shape is displayed in the three-dimensional space in accordance with the viewpoint and the direction of the line of sight included in the display request from among the point cloud data stored in the point cloud data storage unit 10 (step S4).

Then, the thinning-out unit 13 decides the part with the low priority in accordance with the display state of the stereoscopic shape designated on the basis of the designation included in the display request received by the display request receiving unit 11, and executes the process of thinning out the point cloud data of the part with the low priority from among the point cloud data extracted by the point cloud data extracting unit 12 (step S5). Then, the point cloud data transmitting unit 14 transmits the point cloud data remaining after thinning-out by the thinning-out unit 13 among the point cloud data extracted by the point cloud data extracting unit 12 to the receiving apparatus 200 (step S6).

The point cloud data receiving unit 23 of the receiving apparatus 200 receives the point cloud data transmitted from the transmitting apparatus 100 in response to the display request transmitted by the display request transmitting unit 22 in step S2 (step S7). Then, the display control unit 24 renders the stereoscopic image in the three-dimensional space on the basis of the point cloud data received by the point cloud data receiving unit 23 and causes the display 203 to display the stereoscopic image (step S8).

Thereafter, the display state designating unit 21 decides whether or not an instruction to end the display of the stereoscopic shape is given from the user (step S9), and returns to step S1 and continues the process when the instruction to end the display of the stereoscopic shape is not given. Accordingly, the process of steps S1 to S9 is repeatedly executed at predetermined time intervals. On the other hand, when the instruction to end the display is given, the process of the flowchart illustrated in FIG. 3 is ended.

As described above in detail, in the present embodiment, the display request including the designation related to the display state of the stereoscopic shape in the three-dimensional space is transmitted from the receiving apparatus 200 to the transmitting apparatus 100, and the transmitting apparatus 100 extracts the point cloud data of the part corresponding to the display request from among the point cloud data stored in the point cloud data storage unit 10 and transmit the extracted point cloud data to the receiving apparatus 200.

According to the present embodiment having the above configuration, only the point cloud data of the part necessary for the display state of the stereoscopic shape to be actually displayed in the three-dimensional space by the receiving apparatus 200 among the point cloud data stored in the point cloud data storage unit 10 is extracted and transmitted from the transmitting apparatus 100 to the receiving apparatus 200. Therefore, even though the entire data amount of the point cloud data stored in the point cloud data storage unit 10 of the transmitting apparatus 100 is huge, it is possible to transmit only the point cloud data necessary for the display in the receiving apparatus 200 within a practically acceptable short time on the communication network 300.

Also, in the present embodiment, the part with the low priority is decided in accordance with the display state of the stereoscopic shape designated on the basis of the designation included in the display request, and the process of further thinning out the part from the point cloud data extracted from the point cloud data storage unit 10 is executed. In the thinning-out process, the thinning-out amount of the part related to the stereoscopic shape (the stereoscopic shape which is far from the viewpoint and displayed with a small size) increases as the distance between the viewpoint and the stereoscopic shape increases. Since the thinning-out is performed as described, it is possible to further reduce the amount of data of the point cloud data to be transmitted from the transmitting apparatus 100 to the receiving apparatus 200 without substantially reducing the display accuracy of the stereoscopic image displayed in the receiving apparatus 200 and transmit the point cloud data in a shorter time.

Note that, in the above embodiment, the point cloud data extracting unit 12 may further extract point cloud data of a part having a difference from that at the time of previous extraction among the stereoscopic shapes displayed in the display state corresponding to the designation included in the display request from among the point cloud data stored in the point cloud data storage unit 10. In this case, the receiving apparatus 200 synthesizes point cloud data of a part having no difference (the point cloud data already received from the transmitting apparatus 100 last time) with the point cloud data of the part having a difference (the point cloud data received from the transmitting apparatus 100 in accordance with the current display request) and causes the display 203 to display the stereoscopic image.

For example, in a case in which the point cloud data stored in the point cloud data storage unit 10 is for moving images, and the designation of the viewpoint and the direction of the line of sight included in the display request transmitted at predetermined time intervals is not different from the previous one, point cloud data of a part of a structure or an installed object which is stationary in the photographing target area is not extracted, and only point cloud data of a part in which a mobile object is moving is extracted. Also, when the point cloud data stored in the point cloud data storage unit 10 is for still images, and the designation of the viewpoint and the direction of the line of sight included in the display request transmitted at predetermined time intervals is not different from the previous one, the point cloud data is not extracted from the point cloud data storage unit 10 at all at this timing. Accordingly, it is possible to further reduce the amount of data of the point cloud data to be transmitted from the transmitting apparatus 100 to the receiving apparatus 200 and to transmit the point cloud data in a shorter time.

Similarly, in the above embodiment, the thinning-out unit 13 may further thin out the point cloud data of the part having no difference from that at the time of previous extraction among the stereoscopic shapes displayed in the display state corresponding to the designation included in the display request from among the point cloud data stored in the point cloud data storage unit 10. Also, in this configuration, it is possible to further reduce the amount of data of the point cloud data to be transmitted from the transmitting apparatus 100 to the receiving apparatus 200, and transmit the point cloud data in a shorter time. Moreover, in this configuration, the receiving apparatus 200 need not perform the process of synthesizing the previous point cloud data of the part having no difference with the current point cloud data of the part having a difference, and the stereoscopic image may only be displayed on the display 203 at predetermined time intervals using the point cloud data transmitted at predetermined time intervals, the processing load on the receiving apparatus 200 can be reduced.

In the above embodiment, the configuration using both the viewpoint and the direction of line of sight of the user in the three-dimensional space has been described as the content of the designation related to the display state of the stereoscopic shape, but a configuration using only one of them may be employed. In other words, the viewpoint may be fixed in the three-dimensional space, and only the direction of the line of sight may be variable, and a configuration using the direction of the line of sight of the user may be used as the content of the designation related to the display state of the stereoscopic shape. Alternatively, the direction of the line of sight may be fixed in the three-dimensional space, and only the viewpoint may be variable, and a configuration using the viewpoint of the user may be used as the content of the designation related to the display state of the stereoscopic shape.

Also, although the configuration using the viewpoint and the direction of the line of sight of the user in the three-dimensional space has been described as the content of the designation related to the display state of the stereoscopic shape in the above embodiment, but the invention is not limited to this example. For example, a configuration in which the viewpoint and the direction of line of sight are fixed, and a display range is changed by enlarging or reducing the stereoscopic image may be used as the designation related to the display state of the stereographic shape. Further, a configuration in which point cloud data of a plurality of locations generated from the captured images of a plurality of photographing target areas is stored in the point cloud data storage unit 10, and switching the point cloud data of the photographing target area to be displayed may be used as the designation related to the display state of the stereoscopic shape. For example, the above example is suitably applied when a plurality of areas are monitored as disclosed in Patent Document 1.

Moreover, the example in which the point cloud data generated by the point cloud data generating apparatus which is not illustrated in the drawings is stored in the point cloud data storage unit 10 in advance has been described in above embodiment, but the invention is not limited to this example. For example, the point cloud data for moving images generated by the point cloud data generating apparatus is sequentially stored in the point cloud data storage unit 10 in real time, and the point cloud data corresponding to the display request may be extracted from the point cloud data storage unit 10 in real time and transmitted to the receiving apparatus 200.

Also, in the above embodiment, the configuration in which the receiving apparatus 200 has both the function of receiving the point cloud data and the function of displaying the stereoscopic image has been described, but the invention is not limited to this example. For example, the display state designating unit 21 and the display control unit 24 may be installed in another apparatus different from the receiving apparatus 200.

In the above embodiment, the point cloud data has been described as being generated by the method disclosed in Patent Document 1, but the invention is not limited to this example. For example, the point cloud data may be generated by a method using a three-dimensional laser scanner, or surface format data such as polygon mesh or triangular mesh may be converted into point cloud data by a known method.

Also, in the above embodiment, the point cloud data to be transmitted from the transmitting apparatus 100 to the receiving apparatus 200 may be compressed. In this case, data compression may be performed as follows. In other words, the point cloud data is projected onto a plurality of predetermined two-dimensional planes (for example, two-dimensional planes in an original captured image) on the basis of the depth information, thus a plurality of pieces of two-dimensional image data having pixel values in a state in which the number of data is reduced by the point cloud data extracting unit 12 and the thinning-out unit 13 (the thinning-out unit 13 may be omitted as described above) are generated. Then, a known image compression such as MPEG is performed on a plurality of pieces of two-dimensional image data generated as described above, and a plurality of pieces of compressed two-dimensional image data and the depth information are transmitted from the transmitting apparatus 100 to the receiving apparatus 200. Also, the depth information may be separately compressed and transmitted. Accordingly, the amount of data to be transmitted can be further reduced. Note that, in this case, the point cloud data stored in the point cloud data storage unit 10 includes information of associating each point with corresponding depth information.

Figure 4:
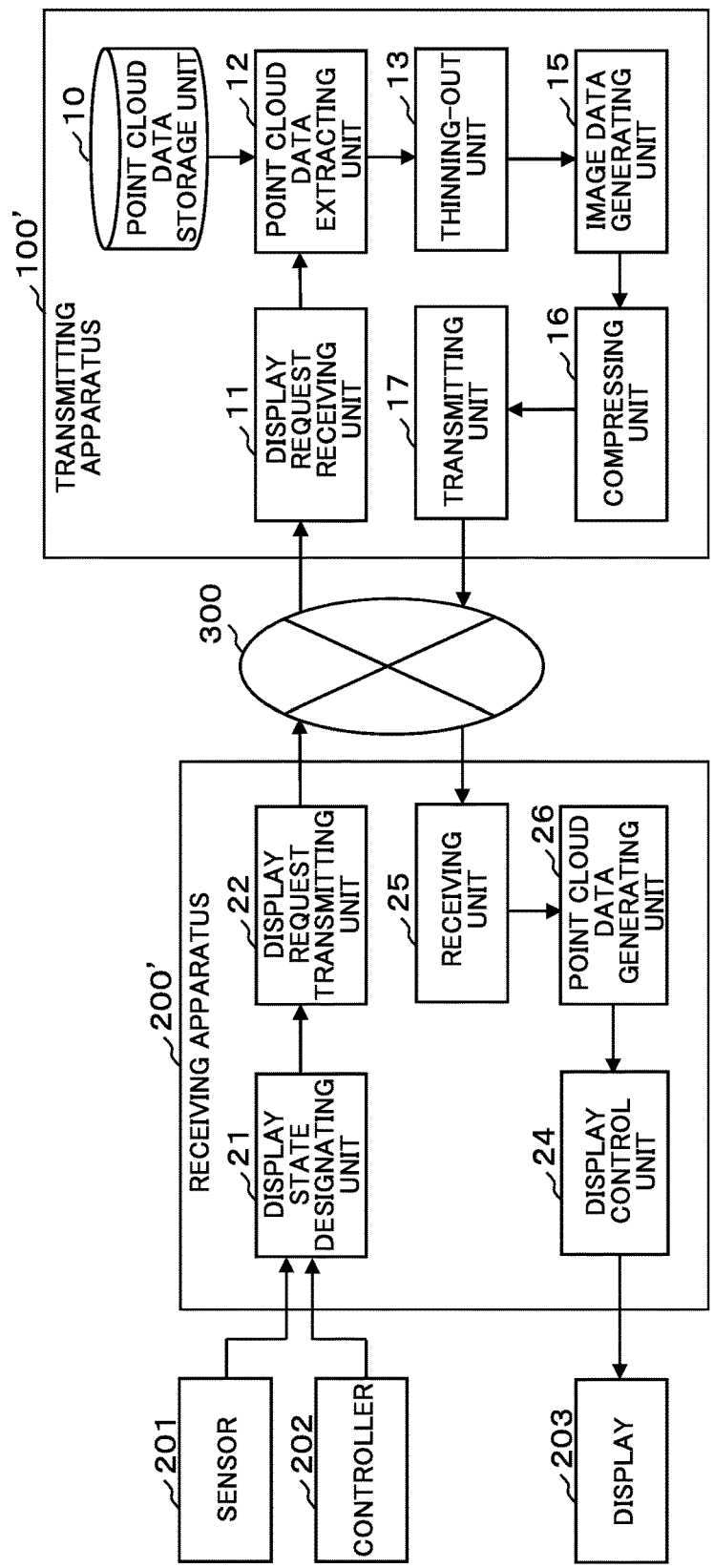
FIG. 4 is a block diagram illustrating an example of a functional configuration of a point cloud data communication system according to another embodiment.

FIG. 4 is a block diagram illustrating a functional configuration example of the point cloud data communication system in a case in which the compression process is performed as described above. Note that, in FIG. 4, components given the same reference numerals as the reference numerals illustrated in FIG. 1 have the same functions, and thus repeated description is omitted here.

As illustrated in FIG. 4, a transmitting apparatus 100' includes an image data generating unit 15, a compressing unit 16 and a transmitting unit 17 instead of the point cloud data transmitting unit 14. Also, the receiving apparatus 200' includes a receiving unit 25 and a point cloud data generating unit 26 instead of point cloud data receiving unit 23.

The image data generating unit 15 generates a plurality of pieces of two-dimensional image data by projecting the point cloud data remaining after thinning out by the thinning-out unit 13 onto a plurality of predetermined two-dimensional planes (for example, two-dimensional planes in an original captured image) on the basis of the depth information associated with the point cloud data. The compressing unit 16 performs the image compression on each of a plurality of pieces of two-dimensional image data generated by the image data generating unit 15. The transmitting unit 17 transmits a plurality of pieces of two-dimensional image data compressed by the compressing unit 16 and the depth information to the receiving apparatus 200'.

The receiving unit 25 receives a plurality of pieces of two-dimensional image data and the depth information transmitted from the transmitting apparatus 100' in response to the display request transmitted by the display request transmitting unit 22. The point cloud data generating unit 26 generates the point cloud data indicating the stereoscopic image in which the stereoscopic shapes included in a plurality of pieces of two-dimensional image data are synthesized into one by projecting the values of the pixels of the stereoscopic shapes included in a plurality of pieces of two-dimensional image data received by the receiving unit 25 in direction of a plurality of projection planes in accordance with the depth information received by the receiving unit 25, and supplies the generated point cloud data to the display control unit 24. A plurality of projection planes are similar to the projection planes used when the point cloud data stored in the point cloud data storage unit 10 is generated.

Note that, in FIG. 4, the configuration in which the two-dimensional image data is generated from the point cloud data remaining after thinning-out by thinning-out unit 13 has been described, but the thinning-out unit 13 may be omitted, and the two-dimensional image data may be generated from the point cloud data extracted by the point cloud data extracting unit 12.

In addition, the above embodiment is only an example of implementation for carrying out the invention, and the technical scope of the invention should not be interpreted in a limited manner. In other words, the invention can be implemented in various forms without departing from the gist thereof or the main features thereof.

The invention claimed is:

1. A point cloud data communication system, comprising:
a transmitting apparatus; and
a receiving apparatus,
wherein point cloud data is transmitted from the transmitting apparatus to the receiving apparatus via a communication network,
the transmitting apparatus includes:
a point cloud data storage unit that stores point cloud data indicating a stereoscopic shape in a three-dimensional space,
a display request receiving unit that receives a display request transmitted from the receiving apparatus,
a point cloud data extracting unit that extracts point cloud data of a part corresponding to the display request received by the display request receiving unit from among the point cloud data stored in the point cloud data storage unit, and
a point cloud data transmitting unit that transmits the point cloud data extracted by the point cloud data extracting unit to the receiving apparatus,
the receiving apparatus includes:
a display request transmitting unit that transmits the display request including designation related to a display state of the stereographic shape in the three-dimensional space to the transmitting apparatus, and
a point cloud data receiving unit that receives the point cloud data transmitted from the transmitting apparatus in response to the display request transmitted by the display request transmitting unit,
wherein the point cloud data stored in the point cloud data storage unit is point cloud data indicating a stereoscopic image in which the stereoscopic shapes included in a plurality of captured images are synthesized into one, the stereoscopic image being generated by setting a plurality of projection planes in accordance with a relative angular relation of a plurality of cameras installed to photograph a photographing target area from a plurality of angles, calculating depth information indicating distances of the stereoscopic shapes included in the plurality of captured images captured by the plurality of cameras from the cameras for each pixel, and projecting values of pixels of the stereoscopic shapes included in the plurality of captured images in directions of the projection planes corresponding to the captured images in accordance with the depth information,
at least one of a viewpoint and a direction of a line of sight from the viewpoint is variable in the three-dimensional space,
the display request transmitting unit transmits the display request including at least one of the viewpoint and the direction of the line of sight designated by a user as the designation related to the display state of the stereoscopic shape to the transmitting apparatus, and
the point cloud data extracting unit decides a camera of a direction to which a priority is given in accordance with the viewpoint on the basis of a relation between the viewpoint included in the display request and positions of the plurality of cameras, and extracts the point cloud data generated from the values of the pixels included in a captured image by the decided camera from among the point cloud data stored in the point cloud data storage unit as point cloud data of a part to which a priority is given when the stereographic shape is displayed in the three-dimensional space.

2. A point cloud data communication system, comprising:
a transmitting apparatus; and
a receiving apparatus,
wherein point cloud data is transmitted from the transmitting apparatus to the receiving apparatus via a communication network,
the transmitting apparatus includes
a point cloud data storage unit that stores point cloud data indicating a stereoscopic shape in a three-dimensional space,
a display request receiving unit that receives a display request transmitted from the receiving apparatus,
a point cloud data extracting unit that extracts point cloud data of a part corresponding to the display request received by the display request receiving unit from among the point cloud data stored in the point cloud data storage unit,
a thinning-out unit that decides a part with a low priority in accordance with a display state of the stereographic shape specified on the basis of a designation included in the display request, and extracts point cloud data of the part with the low priority from among the point cloud data extracted by the point cloud data extracting unit, and
a point cloud data transmitting unit that transmits the point cloud data remaining after thinning-out by the thinning-out unit among the point cloud data extracted by the point cloud data extracting unit to the receiving apparatus, and
the receiving apparatus includes
a display request transmitting unit that transmits the display request including designation related to a display state of the stereographic shape in the three-dimensional space to the transmitting apparatus, and
a point cloud data receiving unit that receives the point cloud data transmitted from the transmitting apparatus in response to the display request transmitted by the display request transmitting unit,
wherein the point cloud data stored in the point cloud data storage unit is point cloud data indicating a stereoscopic image in which the stereoscopic shapes included in a plurality of captured images are synthesized into one, the stereoscopic image being generated by setting a plurality of projection planes in accordance with a relative angular relation of a plurality of cameras installed to photograph a photographing target area from a plurality of angles, calculating depth information indicating distances of the stereoscopic shapes included in the plurality of captured images captured by the plurality of cameras from the cameras for each pixel, and projecting values of pixels of the stereoscopic shapes included in the plurality of captured images in directions of the projection planes corresponding to the captured images in accordance with the depth information,
at least one of a viewpoint and a direction of a line of sight from the viewpoint is variable in the three-dimensional space,
the display request transmitting unit transmits the display request including at least one of the viewpoint and the direction of the line of sight designated by a user as the designation related to the display state of the stereoscopic shape to the transmitting apparatus, the point cloud data extracting unit extracts point cloud data of a part to which a priority is given when the stereoscopic shape is displayed in the three-dimensional space in accordance with at least one of the viewpoint and the direction of the line of sight included in the display request from among the point cloud data stored in the point cloud data storage unit, and the thinning-out unit calculates, when a part is thinned out from among the point cloud data extracted by the point cloud data extracting unit, a distance from the viewpoint to the stereoscopic shape on the basis of position information of each point projected in accordance with the depth information, and increases a thinning-out amount of point cloud data of a part related to a stereoscopic shape having a long distance from the viewpoint.

3. The point cloud data communication system according to claim 1, wherein, instead of the point cloud data transmitting unit, the transmitting apparatus includes an image data generating unit that generates a plurality of pieces of two-dimensional image data by projecting the point cloud data extracted by the point cloud data extracting unit onto a plurality of predetermined two-dimensional planes on the basis of the depth information, a compression unit that performs image compression on the plurality of pieces of two-dimensional image data generated by the above image data generating unit, and a transmitting unit that transmits the plurality of two-dimensional image data compressed by the compressing unit and the depth information to the receiving apparatus, and instead of the point cloud data receiving unit, the receiving apparatus includes a receiving unit that receives the plurality of pieces of two-dimensional image data and the depth information transmitted from the transmitting apparatus in response to the display request transmitted by the display request transmitting unit, and a point cloud data generating unit that generates the point cloud data indicating a stereoscopic image in which the stereoscopic shapes included in a plurality of pieces of two-dimensional image data are synthesized into one by projecting the values of the pixels of the stereoscopic shapes included in the plurality of pieces of two-dimensional image data received by the receiving unit in directions of a plurality of projection planes in accordance with the depth information received by the receiving unit.

4. The point cloud data communication system according to claim 2, wherein, instead of the point cloud data transmitting unit, the transmitting apparatus includes an image data generating unit that generates a plurality of pieces of two-dimensional image data by projecting the point cloud data remaining after thinning-out by the thinning-out unit onto a plurality of predetermined two-dimensional planes on the basis of the depth information, a compression unit that performs image compression on the plurality of pieces of two-dimensional image data generated by the image data generating unit, and a transmitting unit that transmits the plurality of pieces of two-dimensional image data compressed by the compressing unit and the depth information to the receiving apparatus, and instead of the point cloud data receiving unit, the receiving apparatus includes a receiving unit that receives the plurality of pieces of two-dimensional image data and the depth information transmitted from the transmitting apparatus in response to the display request transmitted by the display request transmitting unit, and a point cloud data generating unit that generates the point cloud data indicating a stereoscopic image in which the stereoscopic shapes included in a plurality of pieces of two-dimensional image data are synthesized into one by projecting the values of the pixels of the stereoscopic shapes included in the plurality of pieces of two-dimensional image data received by the receiving unit in directions of a plurality of projection planes in accordance with the depth information received by the receiving unit.

5. A point cloud data transmitting apparatus that transmits point cloud data to a receiving apparatus via a communication network, comprising:

a point cloud data storage unit that stores point cloud data indicating a stereoscopic shape in a three-dimensional space;

a display request receiving unit that receives a display request including designation related to a display state of the stereoscopic shape in the three-dimensional space from the receiving apparatus;

a point cloud data extracting unit that extracts point cloud data of a part corresponding to the display request received by the display request receiving unit from among the point cloud data stored in the point cloud data storage unit; and a point cloud data transmitting unit that transmits the point cloud data extracted by the point cloud data extracting unit to the receiving apparatus, wherein the point cloud data stored in the point cloud data storage unit is point cloud data indicating a stereoscopic image in which the stereoscopic shapes included in a plurality of captured images are synthesized into one, the stereoscopic image being generated by setting a plurality of projection planes in accordance with a relative angular relation of a plurality of cameras installed to photograph a photographing target area from a plurality of angles, calculating depth information indicating distances of the stereoscopic shapes included in the plurality of captured images captured by the plurality of cameras from the cameras for each pixel, and projecting values of pixels of the stereoscopic shapes included in the plurality of captured images in directions of the projection planes corresponding to the captured images in accordance with the depth information, at least one of a viewpoint and a direction of a line of sight from the viewpoint is variable in the three-dimensional space, the display request receiving unit receives the display request including at least one of the viewpoint and the direction of the line of sight designated by a user as the designation related to the display state of the stereoscopic shape from the receiving apparatus, and the point cloud data extracting unit decides a camera of a direction to which a priority is given in accordance with the viewpoint on the basis of a relation between the viewpoint included in the display request and positions of the plurality of cameras, and extracts the point cloud data generated from the values of the pixels included in a captured image by the decided camera from among the point cloud data stored in the point cloud data storage unit as point cloud data of a part to which a priority is given when the stereographic shape is displayed in the three-dimensional space.

6. A method of transmitting point cloud data indicating a stereoscopic shape in a three-dimensional space from a transmitting apparatus including a point cloud data storage unit that stores the point cloud data to a receiving apparatus via a communication network, comprising:
- a step of receiving, by a display request receiving unit of the transmitting apparatus, a display request including designation related to a display state of the stereoscopic shape in the three-dimensional space from the receiving apparatus;
- a step of extracting, by a point cloud data extracting unit of the transmitting apparatus, point cloud data of a part corresponding to the display request received by the display request receiving unit from among the point cloud data stored in the point cloud data storage unit; and
- a step of transmitting, by the point cloud data transmitting unit of the transmitting apparatus, the point cloud data extracted by the point cloud data extracting unit to the receiving apparatus,
- wherein the point cloud data stored in the point cloud data storage unit is point cloud data indicating a stereoscopic image in which the stereoscopic shapes included in a plurality of captured images are synthesized into one, the stereoscopic image being generated by setting a plurality of projection planes in accordance with a relative angular relation of a plurality of cameras installed to photograph a photographing target area from a plurality of angles, calculating depth information indicating distances of the stereoscopic shapes included in the plurality of captured images captured by the plurality of cameras from the cameras for each pixel, and projecting values of pixels of the stereoscopic shapes included in the plurality of captured images in directions of the projection planes corresponding to the captured images in accordance with the depth information,
- at least one of a viewpoint and a direction of a line of sight from the viewpoint is variable in the three-dimensional space,
- the display request receiving unit receives the display request including at least one of the viewpoint and the direction of the line of sight designated by a user as the designation related to the display state of the stereoscopic shape from the receiving apparatus, and
- the point cloud data extracting unit decides a camera of a direction to which a priority is given in accordance with the viewpoint on the basis of a relation between the viewpoint included in the display request and positions of the plurality of cameras, and extracts the point cloud data generated from the values of the pixels included in a captured image by the decided camera from among the point cloud data stored in the point cloud data storage unit as point cloud data of a part to which a priority is given when the stereographic shape is displayed in the three-dimensional space.

7. A point cloud data transmitting apparatus that transmits point cloud data to a receiving apparatus via a communication network, comprising:
- a point cloud data storage unit that stores point cloud data indicating a stereoscopic shape in a three-dimensional space;
- a display request receiving unit that receives a display request including designation related to a display state of the stereoscopic shape in the three-dimensional space from the receiving apparatus;
- a point cloud data extracting unit that extracts point cloud data of a part corresponding to the display request received by the display request receiving unit from among the point cloud data stored in the point cloud data storage unit;
- a thinning-out unit that decides a part with a low priority in accordance with the display state of the stereographic shape specified on the basis of the designation included in the display request, and extracts point cloud data of the part with the low priority from among the point cloud data extracted by the point cloud data extracting unit; and
- a point cloud data transmitting unit that transmits the point cloud data remaining after thinning-out by the thinning-out unit among the point cloud data extracted by the point cloud data extracting unit to the receiving apparatus,
- wherein the point cloud data stored in the point cloud data storage unit is point cloud data indicating a stereoscopic image in which the stereoscopic shapes included in a plurality of captured images are synthesized into one, the stereoscopic image being generated by setting a plurality of projection planes in accordance with a relative angular relation of a plurality of cameras installed to photograph a photographing target area from a plurality of angles, calculating depth information indicating distances of the stereoscopic shapes included in the plurality of captured images captured by the plurality of cameras from the cameras for each pixel, and projecting values of pixels of the stereoscopic shapes included in the plurality of captured images in directions of the projection planes corresponding to the captured images in accordance with the depth information,
- at least one of a viewpoint and a direction of a line of sight from the viewpoint is variable in the three-dimensional space,
- the display request receiving unit receives the display request including at least one of the viewpoint and the direction of the line of sight designated by a user as the designation related to the display state of the stereoscopic shape from the receiving apparatus,
- the point cloud data extracting unit extracts point cloud data of a part to which a priority is given when the stereoscopic shape is displayed in the three-dimensional space in accordance with at least one of the viewpoint and the direction of the line of sight included in the display request from among the point cloud data stored in the point cloud data storage unit, and
- the thinning-out unit calculates, when a part is thinned out from among the point cloud data extracted by the point cloud data extracting unit, a distance from the viewpoint to the stereoscopic shape on the basis of position information of each point projected in accordance with the depth information, and increases a thinning-out amount of point cloud data of a part related to a stereoscopic shape having a long distance from the viewpoint.

8. A method of transmitting point cloud data indicating a stereoscopic shape in a three-dimensional space from a transmitting apparatus including a point cloud data storage unit that stores the point cloud data to a receiving apparatus via a communication network, comprising:

a step of receiving, by a display request receiving unit of the transmitting apparatus, a display request including designation related to a display state of the stereoscopic shape in the three-dimensional space from the receiving apparatus;

a step of extracting, by a point cloud data extracting unit of the transmitting apparatus, point cloud data of a part corresponding to the display request received by the display request receiving unit from among the point cloud data stored in the point cloud data storage unit; and a step of deciding, by a thinning-out unit of the transmitting apparatus, a part with a low priority in accordance with the display state of the stereographic shape specified on the basis of the designation included in the display request, and extracting point cloud data of the part with the low priority from among the point cloud data extracted by the point cloud data extracting unit; and a step of transmitting, by the point cloud data transmitting unit of the transmitting apparatus, the point cloud data remaining after thinning-out by the thinning-out unit among the point cloud data extracted by the point cloud data extracting unit to the receiving apparatus, wherein the point cloud data stored in the point cloud data storage unit is point cloud data indicating a stereoscopic image in which the stereoscopic shapes included in a plurality of captured images are synthesized into one, the stereoscopic image being generated by setting a plurality of projection planes in accordance with a relative angular relation of a plurality of cameras installed to photograph a photographing target area from a plurality of angles, calculating depth information indicating distances of the stereoscopic shapes included in the plurality of captured images captured by the plurality of cameras from the cameras for each pixel, and projecting values of pixels of the stereoscopic shapes included in the plurality of captured images in directions of the projection planes corresponding to the captured images in accordance with the depth information, at least one of a viewpoint and a direction of a line of sight from the viewpoint is variable in the three-dimensional space, the display request receiving unit receives the display request including at least one of the viewpoint and the direction of the line of sight designated by a user as the designation related to the display state of the stereoscopic shape from the receiving apparatus, the point cloud data extracting unit extracts point cloud data of a part to which a priority is given when the stereoscopic shape is displayed in the three-dimensional space in accordance with at least one of the viewpoint and the direction of the line of sight included in the display request from among the point cloud data stored in the point cloud data storage unit, and the thinning-out unit calculates, when a part is thinned out from among the point cloud data extracted by the point cloud data extracting unit, a distance from the viewpoint to the stereoscopic shape on the basis of position information of each point projected in accordance with the depth information, and increases a thinning-out amount of point cloud data of a part related to a stereoscopic shape having a long distance from the viewpoint.

* * * * *